(12) United States Patent
Labbe et al.

(10) Patent No.: US 8,424,631 B2
(45) Date of Patent: Apr. 23, 2013

(54) MOTOR VEHICLE FRONT END

(75) Inventors: Klaus Labbe, Undenheim (DE); Juergen Hulbert, Eltville (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/382,487

(22) PCT Filed: Jul. 5, 2010

(86) PCT No.: PCT/EP2010/004061
§ 371 (c)(1),
(2), (4) Date: Jan. 5, 2012

(87) PCT Pub. No.: WO2011/003560
PCT Pub. Date: Jan. 13, 2011

(65) Prior Publication Data
US 2012/0104776 A1 May 3, 2012

(30) Foreign Application Priority Data
Jul. 6, 2009 (DE) .......................... 10 2009 031 782

(51) Int. Cl.
*B62D 21/00* (2006.01)
(52) U.S. Cl.
USPC ........................................................ 180/312
(58) Field of Classification Search .................. 180/312; 296/187, 188, 189, 203.1, 203.2, 205
See application file for complete search history.

(56) References Cited

U.S. PATENT DOCUMENTS

| 5,118,160 | A | * | 6/1992 | Kitagawa et al. | ........ 296/187.03 |
| 5,466,033 | A | | 11/1995 | Murakami et al. | |
| 5,984,403 | A | * | 11/1999 | Kuroda | .................... 296/187.03 |
| 6,068,330 | A | | 5/2000 | Kasuga et al. | |
| 6,203,098 | B1 | | 3/2001 | Motozawa et al. | |
| 7,097,235 | B2 | * | 8/2006 | Yasukouchi et al. | ...... 296/187.03 |
| 8,201,872 | B2 | * | 6/2012 | Baccouche et al. | ...... 296/187.09 |
| 2003/0184124 | A1 | | 10/2003 | Yamaguchi | |

FOREIGN PATENT DOCUMENTS

| DE | 102005004714 A1 | 8/2006 |
| DE | 102006044064 A1 | 3/2008 |
| DE | 102008035448 A1 | 3/2009 |

OTHER PUBLICATIONS

International Searching Authority, International Search Report for Application No. PCT/EP2010/004061, dated Sep. 16, 2010.
German Patent Office, German Search Report for Application No. 102009031782.1, dated Oct. 13, 2010.

* cited by examiner

*Primary Examiner* — Faye M. Fleming
(74) *Attorney, Agent, or Firm* — Ingrassia Fisher & Lorenz, P.C.

(57) ABSTRACT

A motor vehicle front structure is provided that has at least one first longitudinal girder and at least one first crash box. The first crash box has a deformation section and a fastening section, the fastening section connected to the first longitudinal girder. Moreover, the motor vehicle front structure has an engine mount, the engine mount having a first fastening section, which is connected to the first longitudinal girder. The fastening section of the first crash box and the first fastening section of the engine mount have a common overlap area.

15 Claims, 3 Drawing Sheets ental-Stage entry under 35

MOTOR VEHICLE FRONT END

CROSS-REFERENCE TO RELATED APPLICATIONS

This application is a U.S. National-Stage entry under 35 U.S.C. §371 based on International Application No. PCT/EP2010/004061, filed Jul. 5, 2010, which was published under PCT Article 21(2) and which claims priority to German Application No. 102009031782.1, filed Jul. 6, 2009, which are all hereby incorporated in their entirety by reference.

TECHNICAL FIELD

The technical field relates to a motor vehicle front structure. The motor vehicle front structure has at least one first longitudinal girder and at least one first crash box, the first crash box having a deformation section and a fastening section. The fastening section is connected to the first longitudinal girder. In addition, the motor vehicle front structure has an engine mount, the engine mount having a first fastening section, which is connected to the first longitudinal girder.

BACKGROUND

Crash boxes are used in motor vehicles to increase the safety. In addition, in the case of accidents at low speed, damage to the vehicle body structure of the motor vehicle can be kept small by the use of crash boxes. For this purpose, the crash boxes are implemented as deformation bodies, which are installed in the motor vehicle so that, in case of an impact of the motor vehicle against an obstruction, they at least partially absorb the occurring impact energy through their deformation. The crash boxes thus reduce the transmission of the impact energy to the vehicle body structure and can thus reduce or prevent its damage.

A crumple zone for a vehicle body of a passenger automobile is known from DE 10 2006 044 064 A1, which has two longitudinal girders of a lower longitudinal girder plane, which run below two main longitudinal girders of a main longitudinal girder plane in the vehicle longitudinal direction and are supported at the rear on load-bearing components of the vehicle body. The two longitudinal girders are each extended to the rear via respective associated crash struts and are supported below the passenger compartment of the passenger automobile. Moreover, the two longitudinal girders are each extended to the front via respective associated extension parts. In addition, the crumple zone has two crash boxes, which are supported on the front end of the respective associated main longitudinal girder. The two crash boxes are connected to one another via a bumper crossbeam.

In view of the foregoing, at least one object is to specify a motor vehicle front structure, which has a simplified construction and a lower weight with safety properties which remain the same, in particular in the case of accidents at lower velocity. In addition, other objects, desirable features and characteristics will become apparent from the subsequent summary and detailed description, and the appended claims, taken in conjunction with the accompanying drawings and this background.

SUMMARY

A motor vehicle front structure is provided that has at least one first longitudinal girder and at least one first crash box. The first crash box has a deformation section and a fastening section and the fastening section is connected to the first longitudinal girder. In addition, the motor vehicle front structure has an engine mount, the engine mount having a first fastening section. The first fastening section is connected to the first longitudinal girder. The fastening section of the first crash box and the first fastening section of the engine mount have a common overlap area.

Because the fastening section of the first crash box and the first fastening section of the engine mount have a common overlap area, the motor vehicle front structure has the advantage that the first crash box and the engine mount are connected to the first longitudinal girder in a common area thereof. Therefore, previously required reinforcements in the area of the engine mounts can be omitted. This results in a lower number of required components for the motor vehicle front structure and a simplified installation of the first crash box and the engine mount. Therefore, the production costs can be reduced. In addition, the motor vehicle front structure has a reduced weight, which results in a reduced fuel consumption and a lower quantity of pollutant emission.

In an embodiment, the deformation section and the fastening section of the first crash box are sections of a common component, in particular a common sheet-metal component. This results in further simplified production and further reduction of the required components of the motor vehicle front structure.

In another of the motor vehicle front structure, the first crash box has an extension area arranged in the direction of a front wall of the motor vehicle. The crash box is therefore extended by the extension area up into the area of the engine mount, where the common overlap area of the fastening section of the first crash box and the first fastening section of the engine mount can advantageously be provided.

In a further embodiment, the fastening section of the first crash box is implemented to engage in the first longitudinal girder. This allows a particularly simple connection of the fastening section to the first longitudinal girder.

In a further embodiment, the fastening section of the first crash box is arranged completely inside the first longitudinal girder. A space-saving connection of the fastening section to the first longitudinal girder is thus made possible.

The first crash box can have a closed hollow profile. In particular, the crash box can be implemented as a thin-walled, rectangular element made of steel, aluminum, or plastic. The crash box can be produced by joining from pressed sheet-metal shells or in one piece, for example, as an extruded aluminum profile. Through a corresponding material selection and/or profile or cross-section selection of the crash box, an adaptation of the motor vehicle front structure to different requirements, for example, different regional legal requirements, is advantageously possible.

The fastening section of the first crash box can be connected to the first longitudinal girder by means of at least one bolt. In addition, the first fastening section of the engine mount can be connected to the first longitudinal girder by means of at least one bolt. This advantageously allows a simple installation of the fastening section of the first crash box or the first fastening section of the engine mount on the first longitudinal girder.

In an embodiment, the fastening section of the first crash box and the first fastening section of the engine mount are connected to the first longitudinal girder by means of at least one common fastener, in particular by means of at least one common bolt. This results in a further simplified production of the motor vehicle front structure and a further reduction of the number of required components and thus a further reduction of the production costs.

In a further embodiment, the deformation section of the first crash box is mounted in front of a front side of the first longitudinal girder. In addition, the deformation section of the first crash box can be arranged between the first longitudinal girder and a bumper crossbeam.

In a further embodiment, the motor vehicle front structure has a third crash box, the third crash box is mounted in front of a front side of the deformation section of the first crash box. The third crash box can be connected to the first crash box. Furthermore, the third crash box preferably has a length which is less than a length of the first crash box. The third crash box can be implemented in such a manner that it is already deformed upon an impact of the motor vehicle on a barrier at a travel velocity of at most 15 km/h. This advantageously permits, after such accidents, which are also referred to as repairable crashes, only the third crash box to have to be replaced.

In a further embodiment, the motor vehicle front structure additionally has at least one second longitudinal girder and at least one second crash box. The second crash box has a deformation section and a fastening section. The fastening section is connected to the second longitudinal girder. Moreover, the engine mount has a second fastening section, the second fastening section connected to the second longitudinal girder. In addition, the fastening section of the second crash box and the second fastening section of the engine mount have a common overlap area. The provision of the common overlap area for the fastening section of the second crash box and the second fastening section of the engine mount also allows the advantages, which were already listed above in connection with the overlap area of the fastening section of the first crash box with the fastening section of the engine mount, for the second crash box. These advantages will not be described once again here to avoid repetitions.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to application and uses. Furthermore, there is no intention to be bound by any theory presented in the preceding background or summary or the following detailed description.

Figure 1:
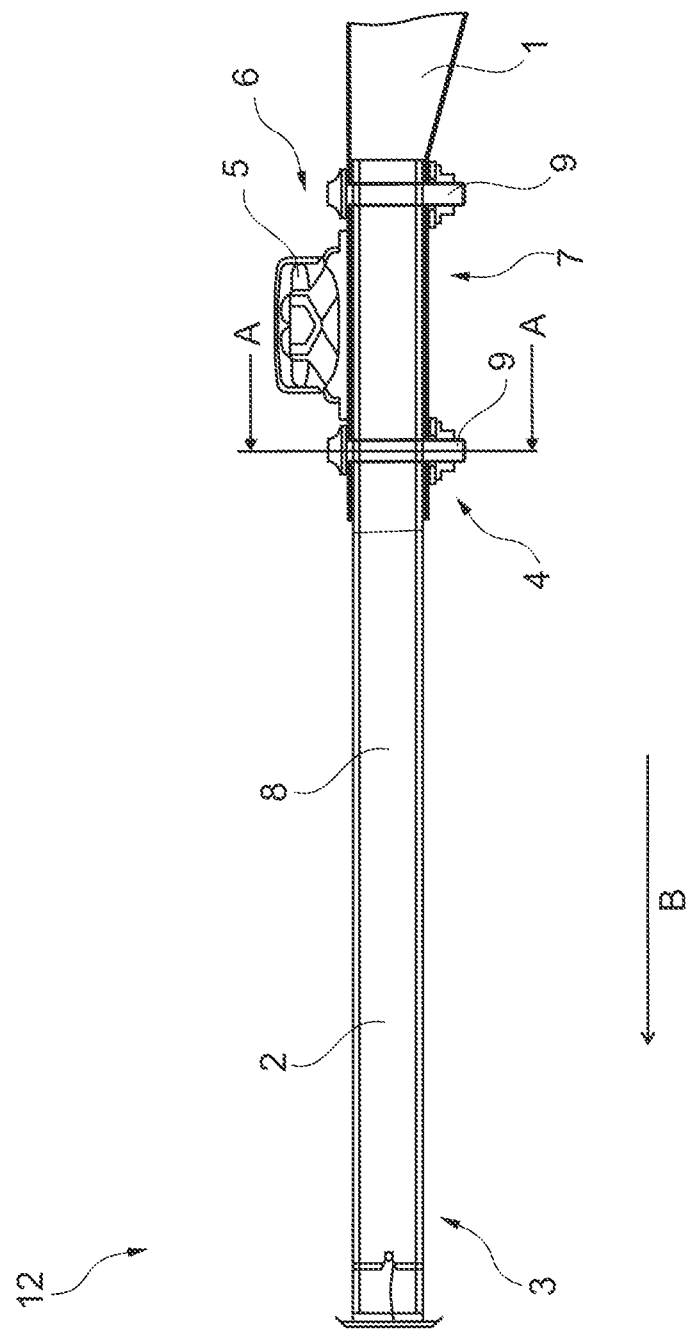
FIG. 1 shows a schematic view of a partial area of a motor vehicle front structure according to a first embodiment.

FIG. 1 shows a schematic view of a partial area of a motor vehicle front structure 12 of a motor vehicle (not shown in greater detail) according to a first embodiment. The motor vehicle front structure 12 has a first longitudinal girder 1 and a structural element in the form of a first crash box 2. The first longitudinal girder 1 extends in a vehicle longitudinal direction indicated by the arrow direction B. The first crash box 2 has a deformation section 3 and a fastening section 4. The fastening section 4 is connected to the first longitudinal girder 1. In the embodiment shown, the fastening section 4 is connected to the first longitudinal girder 1 via two fasteners in the form of two bolts 9. In addition, the motor vehicle front structure 12 has an engine mount 5 for an engine (not shown) of the motor vehicle, the engine mount 5 having a first fastening section 6. The first fastening section 6 is also connected to the first longitudinal girder 1. The fastening section 4 of the first crash box 2 and the first fastening section 6 of the engine mount 5 have a common overlap area 7. Both the fastening section 4 of the first crash box 2 and also the first fastening section 6 of the engine mount 5 are connected to the first longitudinal girder 1 in this common overlap area 7.

In addition, the first crash box 2 has an extension area 8 arranged in the direction of a front side of the motor vehicle. The crash box 2 is therefore extended up into the area of the engine mount 5, whereby simple installation of the crash box 2 by means of the fastening section 4 on the first longitudinal girder 1 in the common overlap area 7 is made possible.

A particularly simple installation of the first crash box 2 is achieved in that the fastening section 4 of the first crash box 2 is implemented to engage in the first longitudinal girder 1. The fastening section 4 of the first crash box 2 is arranged completely inside the first longitudinal girder 1 in the embodiment shown.

The deformation section 3 and the fastening section 4 of the first crash box 2 are sections of a common component in the embodiment. This embodiment has steel, aluminum, and/or plastic, for example. It can be produced by joining from pressed sheet-metal shells or also in one piece, for example, as an extruded aluminum profile, or as a rolled profile, in particular an extruded profile. An adaptation to regional legal requirements is possible through appropriate material selection and/or profile or cross-section selection of the first crash box 2.

Figure 2:
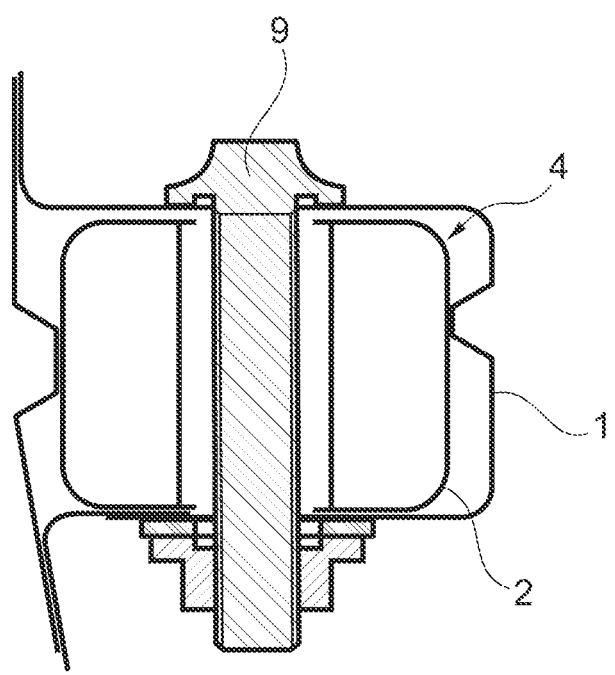
FIG. 2 shows a cross-section through the partial area of the motor vehicle front structure according to FIG. 1 along section line A-A.

FIG. 2 shows a cross-section through a partial area of the motor vehicle front structure according to FIG. 1 along section line A-A. Components having identical functions as in FIG. 1 are identified by identical reference numerals and are not explained in greater detail hereafter. In the embodiment shown, the first crash box 2 has a closed hollow profile, where reinforcements in the area of the engine mount 5 may be dispensed with and, in addition, separate fasteners are not required for fastening the first crash box 2. The first crash box 2 is connected by means of the bolt 9 to the first longitudinal girder 1. The first longitudinal girder 1 also has a hollow profile, into which the fastening section 4 of the first crash box 2 is inserted.

Figure 3:
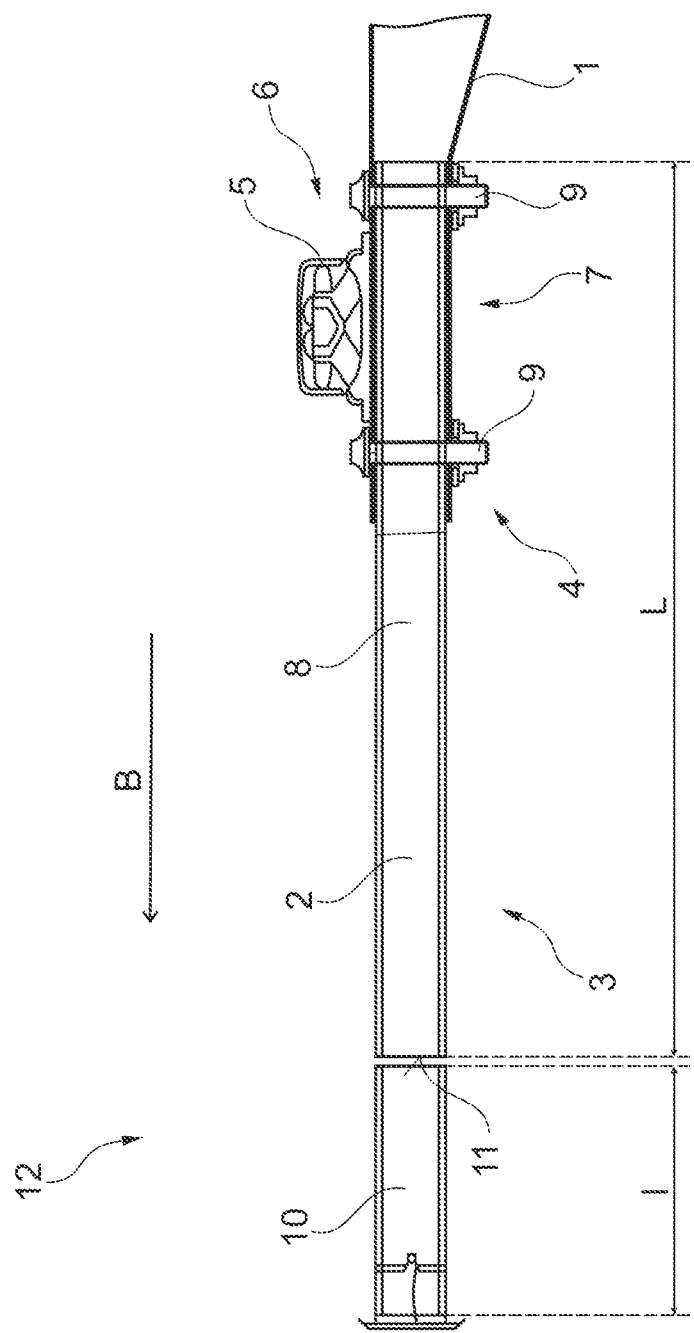
FIG. 3 shows a schematic view of a partial area of a motor vehicle front structure according to a second embodiment.

FIG. 3 shows a schematic view of a partial area of a motor vehicle front structure 12 according to a second embodiment. Components having identical functions as in the preceding figures are identified by identical reference numerals and are not explained in greater detail hereafter. In this second embodiment, the motor vehicle front structure 12 also has a first crash box 2, which is connected in the same way as in FIG. 1 to a first longitudinal girder 1 in the area of a fastening section 4 of the first crash box 2. In the second embodiment, the motor vehicle front structure 12 additionally has a third crash box 10, the third crash box 10 being mounted in front of a front side 11 of a deformation section 3 of the first crash box 2. The third crash box 10 is additionally connected to the first crash box 2 and has a length l in the vehicle longitudinal direction which is less than a length L of the first crash box 2. The third crash box 10 can have a closed hollow profile like the first crash box 2. By providing the third crash box 10, which is used to meet the so-called "low-speed" requirements, in the event of small damage which is caused by an impact of the motor vehicle on a barrier at a travel velocity of at most 15 km/h, advantageously only the third crash box 10 must be replaced.

In summary, various embodiments are therefore possible with respect to a modular design. For example, the motor vehicle front structure 12 can have a continuous structural element in the form of a first crash box 2 up to the engine mount 5, as shown in FIG. 1, the structural element itself in turn being able to be adapted by differently design crash boxes. However, a combination between a short crash box and a long crash box is also possible, as shown in FIG. 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A motor vehicle front structure comprising:
a first longitudinal girder;
a first crash box comprising a deformation section and a first fastening section, the first fastening section connected to the first longitudinal girder;
an engine mount comprising a second fastening section that is connected to the first longitudinal girder; and
a common overlap area of the the fastening section of the first crash box and the second fastening section of the engine mount.

2. The motor vehicle front structure according to claim 1, wherein the deformation section and the first fastening section of the first crash box are sections of a common component.

3. The motor vehicle front structure according to claim 1, wherein the first crash box has an extension area arranged in a direction of a front wall of the motor vehicle.

4. The motor vehicle front structure according to claim 1, wherein the first fastening section of the first crash box engage in the first longitudinal girder.

5. The motor vehicle front structure according to claim 1, wherein the first fastening section of the first crash box completely inside the first longitudinal girder.

6. The motor vehicle front structure according to claim 1, wherein the first crash box comprises a closed hollow profile.

7. The motor vehicle front structure according to claim 1, wherein the first fastening section of the first crash box is connected to the first longitudinal girder with a bolt.

8. The motor vehicle front structure according to claim 1, wherein the second fastening section of the engine mount is connected to the first longitudinal girder with a bolt.

9. The motor vehicle front structure according to claim 1, wherein the first fastening section of the first crash box and the second fastening section of the engine mount are connected to the first longitudinal girder with a common fastener.

10. The motor vehicle front structure according to claim 1, wherein the deformation section of the first crash box is mounted in front of a front side of the first longitudinal girder.

11. The motor vehicle front structure according to claim 1, wherein the deformation section of the first crash box is arranged between the first longitudinal girder and a bumper crossbeam.

12. The motor vehicle front structure according to claim 1, further comprising a third crash box mounted in front of a front side of the deformation section of the first crash box.

13. The motor vehicle front structure according to claim 12, wherein the third crash box is connected to the first crash box.

14. The motor vehicle front structure according to claim 12, wherein the third crash box has a first length that is less than a second length of the first crash box.

15. The motor vehicle front structure according to claim 1, further comprising:
a second longitudinal girder; and
a second crash box comprising a second deformation section and a third fastening section, the third fastening section connected to the second longitudinal girder;
a fourth fastening section of the engine mount that is connected to the second longitudinal girder; and
a second common overlap area of the third fastening section of the second crash box and the fourth fastening section of the engine mount.

* * * * *

UNITED STATES PATENT AND TRADEMARK OFFICE
CERTIFICATE OF CORRECTION

PATENT NO. : 8,424,631 B2
APPLICATION NO. : 13/382487
DATED : April 23, 2013
INVENTOR(S) : Klaus Labbe et al.

It is certified that error appears in the above-identified patent and that said Letters Patent is hereby corrected as shown below:

In the Claims

Column 5, Claim 1, line 31, "common overlap area of the the fastening" should be --common overlap area of the fastening--; and
Column 6, Claim 5, lines 2 and 3 "the first crash box completely" should be --the first crash box is completely--.

Signed and Sealed this
Twenty-second Day of October, 2013

Teresa Stanek Rea
*Deputy Director of the United States Patent and Trademark Office*